Jan. 17, 1961    H. D. BOLTON    2,968,233
TWINE TENSION RELIEF DEVICE FOR BALERS
Filed Jan. 23, 1958    2 Sheets-Sheet 2
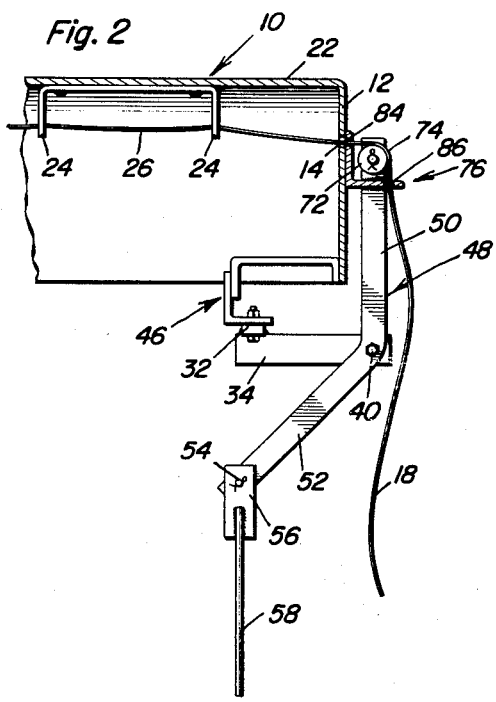
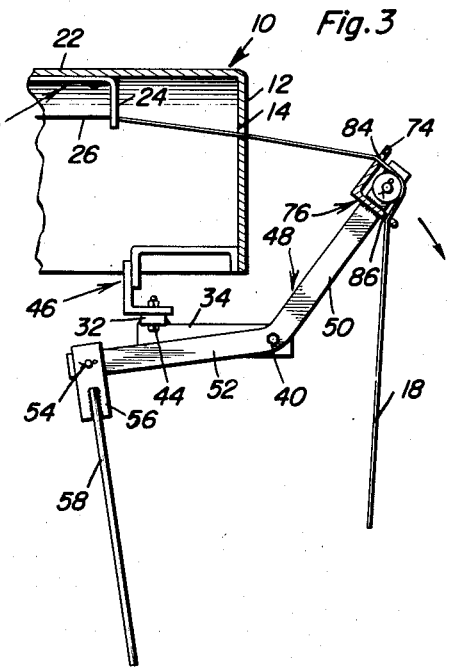
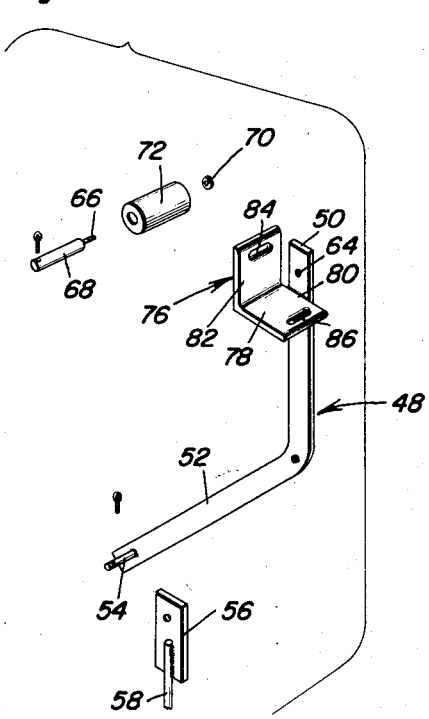
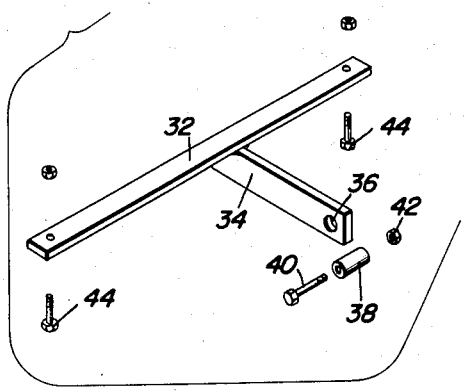
Hugh D. Bolton
INVENTOR.

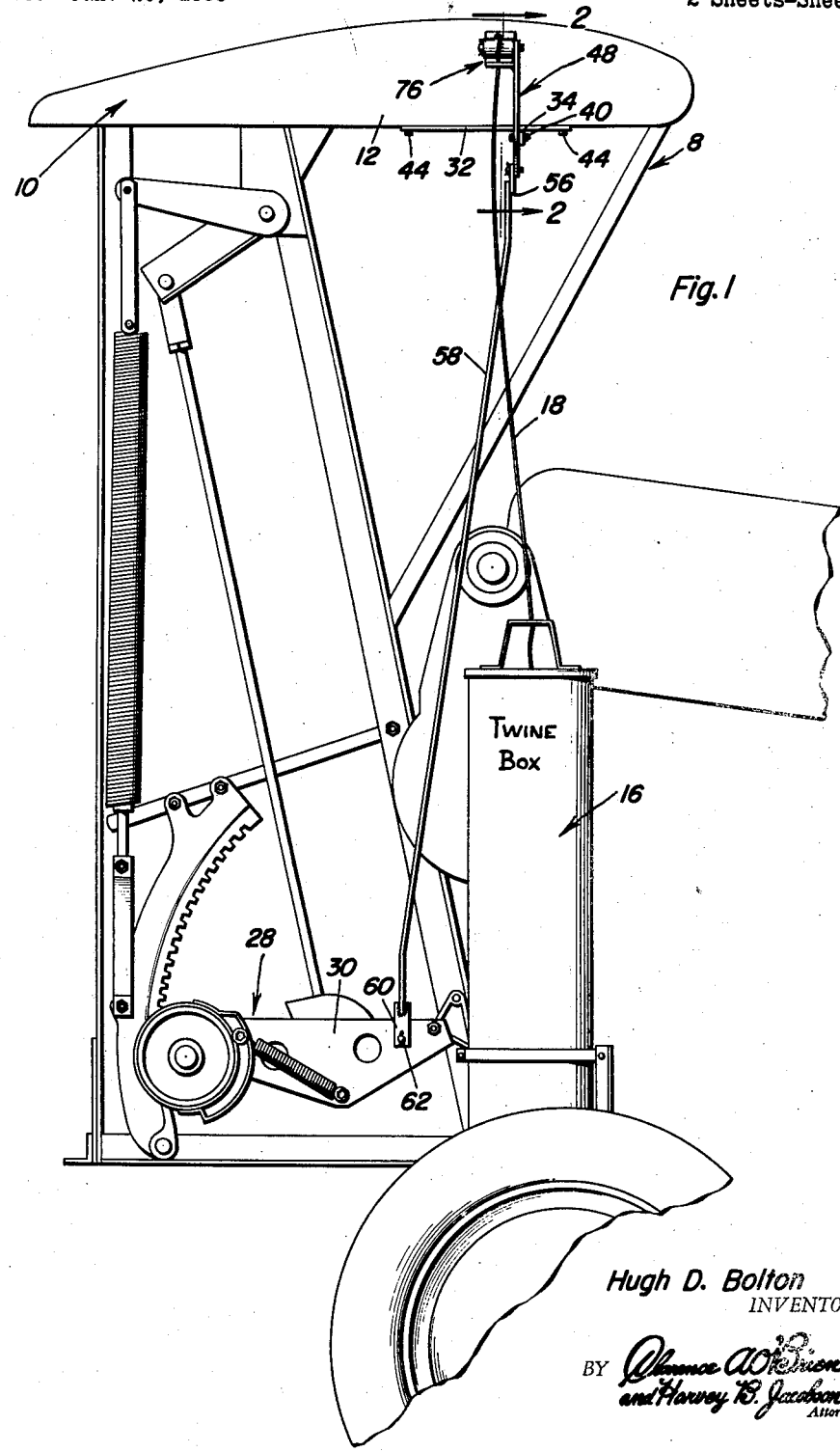

United States Patent Office 2,968,233
Patented Jan. 17, 1961

2,968,233

TWINE TENSION RELIEF DEVICE FOR BALERS

Hugh D. Bolton, R.F.D. 2, Creston, Iowa

Filed Jan. 23, 1958, Ser. No. 710,678

4 Claims. (Cl. 100—5)

This invention relates to a novel automatically functioning device for practical and effectual use in association with the bale wrapping twine such as is used on a hay baler of well known construction which produces round bales and which serves intermittently to effect nominal slack in the twine between the twine supply box and deck of the machine, whereby to diminish excessive twine tension, which now occurs, and interferes with the correct and intended cycle of operation of the baler's twine wrapping mechanism.

Insufficient slack in the twine between the twine box and wrapping and tying means often prevents said tying means from satisfactorily completing the required cycle of operation. This condition and the resultant twine failure allow improperly tied bales to be delivered from the baler. It is an objective in the instant matter to correct this undesirable condition by relieving undue tension, whereby, through the medium of the twine slackening step, the slack provided invariably permits the tension disc on the baler and attending linkage to properly lock an existing spur gear. Consequently, the discharging of undersize and small bales with no twine is aptly prevented.

Briefly summarized, and from the viewpoint of an improved combination, the idea centers around the baler deck which has a depending flange or apron provided with a twine intake and feeding hole, a twine guide bracket fixed on said deck in alinement with and inwardly of said hole, a twine containing and supply box fixedly supported in a plane below said deck, a length of wrapping twine extending from the box through said intake hole and openings provided therefor in said bracket, arm assembly means mounted for operation adjacent said twine box, slack effecting and tension relief means interposed between said twine box and deck, a portion of the twine being operatively connected with said means, and an intermittently actuatable operating connection between the arm of said arm assembly and said slack effecting means, whereby the twine is automatically given the prerequisite slack to permit the baler's tension disc, through the usual linkage, to properly lock a cooperating spur gear, insuring timely functioning of the twine mechanism cycle of operation and discharge of a properly tied bale.

Although, as is obvious, the invention is that which is susceptible of being incorporated in the baler at the time of manufacture, it is here illustrated as a readily applicable and removable attachment for certain makes of balers which are now on the market. The preferred embodiment of the invention, interpreting the same as a so-called attachment, has to do with an adapter bracket which is bracketed on and suspended from a part of the baler deck which is being conveniently referred to here either as a flange or an apron. A simple bellcrank or an equivalent crank is pivotally mounted intermediate its ends on the bracket. The upper end of the upper limb has a suitably mounted idling guide roller over which a portion of the twine is trained. To insure that the twine will remain in proper contact with the surface of the roller a simple L-shaped clip is welded or otherwise secured to the stated limb. This construction permits the roller to be nested, as it were, in the portion of the clip between the angular ends thereof and these angular ends have twine holes therein allowing threading and sliding of the coacting portion of the twine. A simple push-pull rod provides an operating link. This rod is connected at its upper end to the lower limb of the bellcrank and its lower end is hingedly connected to a selected motion transmitting arm which is a part of the existing arm assembly on the baler. These parts go to make up a satisfactory attachment which functions to exert a pull on the twine between the apron and the twine box thus forming a loop in the twine. The loop in turn provides a desired degree of slack and consequently relieves the undesirable tension on the twine.

Other objects, features and advantages will become more readily apparent from the following description and the accompanying drawings.

In the drawings, wherein like numerals are employed to designate like parts throughout the views:

Fig. 1 is a view in elevation showing the portions of the hay baler with which the invention cooperates, the invention appearing, as already mentioned, in the form of a readily applicable easy-to-operate attachment.

Fig. 2 is a section on a larger scale taken approximately on the plane of the vertical line 2—2 of Fig. 1, looking in the direction of the arrows, and showing the crank and roller in what may be described as a normal position.

Fig. 3 is a view like Fig. 2 and which shows the crank swung from left to right to the position needed to exert a pull and to form a loop in the twine which results in the desired twine tension relief.

Fig. 4 is an exploded perspective view showing the crank and its components.

Fig. 5 is an exploded perspective view showing the adapter bracket.

The hay baler is denoted as an entity by the numeral 8 in Fig. 1. The aforementioned deck is designated at 10 and the depending flange or apron at 12. As seen in Figs. 2 and 3, the apron is provided with a twine inlet or intake hole 14 which is ordinarily present in a well known baler now on the market. The conventional twine box, which is fixedly mounted, is seen in Fig. 1 and denoted at 16 and the portion of the twine leading therefrom is denoted at 18. It is this portion of the twine which is to be looped and slackened. Before referring to the attachment reference is made now to a substantially U-shaped inverted bracket 20 which is riveted or otherwise secured to the underneath side of the deck, that is the portion 22 of the deck and the depending arms 24 have holes therethrough to guide the cooperating portion 26 of the twine. Thus the twine passes from the twine box through the hole 14 and through the arms 24 onto the twine wrapping mechanism (not shown). In connection with the latter it is to be pointed out that since the invention resides primarily in the tension relief device or attachment it has been deemed unnecessary to disclose the twine wrapping mechanism and other parts thereof referred to herein. On the other hand, the aforementioned arm assembly is disclosed and this is denoted in Fig. 1 generally by the numeral 28 and the arm in question is the one denoted at 30, this being adjacent to the twine box. The adapter bracket comprises a horizontal member 32 which as seen in Fig. 5 is provided with an outstanding arm 34 having an opening 36 to accommodate the bushing 38 and bolt and nut 40 and 42. The bolts 44 serve to attach the bracket means to the usual supporting bracket means generally denoted at 46 in Figs. 2 and 3.

The bellcrank is denoted generally by the numeral 48 and embodies an upper limb 50 and a lower limb 52, the upper limb normally paralleling the apron 12 in the normal position. The median portion of the crank is pivoted on the arm 34 by the pivot means 40. The lower limb extends laterally or obliquely beneath the deck where it is provided with a stud 54 (Fig. 4) which provides a linking and hinging connection for a cleat 56 on the upper end of the push-pull rod 58. A similar cleat 60 (Fig. 1) at the lower end of the rod serves to provide an operating connection by way of the hinge means 62 from the motion transmitting arm 30. Thus the source of motion 30 is linked to the bellcrank in a simple and proper manner to operate in unison and at the proper stage of operation depending on the cycle of operation of the aforementioned twine wrapping or tying means.

With reference now to Fig. 4 there is a bolt hole 64 in the upper end of the upper limb to accommodate a threaded shank 66 on a journal pin 68, the stud being held in place by an assembling nut 70. The journal serves to accommodate the returning or idling smoothed surface anti-friction and guiding roller 72 over which a portion of the twine is trained for control and operation as denoted at 74 in Figs. 2 and 3. The aforementioned angle clip is denoted at 76 and the horizontal arm 78 is welded or otherwise secured in place on the limb 50 as at 80.

The vertical portion 82 of the clip when in the receiving or normal position is parallel to the apron and has a hole 84 therein cooperating with a similar hole 86 in the other end portion 78 and these two holes allow the twine to be threaded therethrough and trained at the same time over the anti-friction roller 72.

The presence and availability of the hole 14 in the deck flange or apron 12 gave rise to the novel idea of being able to better pass the line or twine from the twine box 16 through the stock bracket 20 and to then add and interpose an efficient tension relief device between the twine box 16 and the apron 12. Manifestly, the tension device could vary but experience has shown that the form which is herein disclosed works quite efficiently. In any event, it will be evident that at the proper stage, controlled by the movement of the motion transmitting arm 30, the tension relief device comes into play and results in moving the bellcrank 48 from the position seen in Fig. 2 to the position seen in Fig. 3. This results in exerting a pull on the twine, and when the crank returns to its normal position sufficient slack then exists in the twine to avoid excessive tension. In practice, when the bale is formed by the baler and the twine which is being used is cut and the bale is dropped, the push rod drops, pulling the bellcrank back to its starting position against the deck. This allows an approximate two inches of twine certain freedom of movement into the twine wrapping mechanism and allows the twine tension disc (not shown) in the twine wrap mechanism, through the usual linkage, to properly lock a spur gear (not shown) and to condition and ready the machine to form the next succeeding or new bale.

In the process of making binder twine such as is used in a baler, there are loose ends of sisal approximately 2 inches long. In making a ball of twine it is started at the center. Also, in using a ball of twine, it is used from the center. It is the loose ends which are bound by succeeding wraps that are the cause of tying and wrapping failure now encountered.

It will be evident that the present invention therefore pertains to a novel structural device which is constructed so that it will allow sufficient slack in the twine tension of a hay baler to allow the twine wrap mechanism to complete every cycle of operation and insure procurement of a fully formed bale, properly tied and delivered from the baler. The invention functions to prevent bales going untied and to prevent small bales from being delivered from the machine due to twine failure from the twine box which is in turn due to excessive tension.

The angular bracket or clip 76 in the position of Fig. 3 is in the correct position during the wrapping and tying of the bale. When the bale is discharged, clip 76 returns to the position seen in Fig. 2. In the formation of the next bale, with approximately 2 inches of slack in the twine between the twine tension disc and the twine box, a full-sized bale will result.

To prepare the machine for actual use, the twine ball is placed in box 16 and fed up over roller 72 into the twine guide hole 14 and onto the twine wrap mechanism (not detailed).

Figure 2 shows the device in beginning position with the twine threaded through the mechanism and ready for operation. As the bale is being formed, the arm assembly 28 travels up, pushing the push rod in an upward direction. This causes the top of the crank arm to carry the roller away from the deck and twine wrap mechanism about two inches until it reaches the position as shown in Figure 3. This extension of the crank arm away from the deck for about 2 inches pulls this extra twine out of the twine box 16. When the bale is formed by the baler, and the twine used in the bale is cut and the bale is dropped, the push rod drops, pulling roller 72 back to its starting position against the deck of the baler, allowing the extra two inches of twine sudden freedom of movement into the twine wrap mechanism and allowing the twine tension disc in the twine wrap mechanism through the customary linkage to always and properly lock the spur gear in the twine wrap mechanism and place the machine in readiness to form a new bale through the same process.

Minor changes in shape, size, materials and rearrangement of components and parts may be resorted to in actual practice without departing from the spirit of the invention or the scope of the invention as hereinafter claimed.

What is claimed as new is as follows:

1. For use in effectuating limited slack and consequently relieving excessive tension in bale wrapping twine between a baler twine holding and supply box and the associated twine wrapping mechanism provided on a hay baler: a slack producing twine-tension-relieving attachment for the deck of the baler adapted to occupy an operating position between the twine supply box and an apertured portion of a vertical apron on the baler deck; said attachment comprising a bellcrank, support means adapted to be secured to the deck apron for operatively locating and supporting the bellcrank in proper relation in respect to the apron and twine supply box respectively, a median portion of the bellcrank being pivotally connected with said support means, said bellcrank having upper and lower limbs, an anti-friction roller mounted for free rotation on a freely swingable end portion of said upper limb and disposed to rotate on an axis at right angles to the plane of said upper limb, a portion of the twine being adapted to be trained for movement over a peripheral surface of the roller, a twine guiding clip also mounted on said upper end portion and having twine guide openings located adjacent to the periphery of the roller, one opening being located below the center of rotation of the roller and outwardly of said roller, the other opening being located above the axis of rotation of the roller and adjacent the peripheral surface of the roller so that the twine which is threaded through said openings from the twine box toward the deck is thus trained over the peripheral surface of the roller, and a reciprocable motion transmitting arm of an arm assembly located on a portion of the baler below the bellcrank.

2. The structure defined in claim 1, wherein said reciprocable means comprises a rigid push-pull rod the upper end of which is hingedly connected to the lower end of said lower limb, the lower end of said rod having means thereon whereby said lower end may be hingedly joined to a predetermined portion of said motion transmitting arm.

3. The structure defined in claim 1 and wherein said clip is angle-like in edge elevation with edge portions of the angular portions thereof cooperating with said upper limb, said clip having one angular end portion underlying the cooperative peripheral surface of the roller and the other end portion disposed at right angles and opposed to a cooperating surface of the roller, said guide openings being formed in the angular portions of said clip and said roller being nested in and partially embraced by the angular portions of the clip.

4. The structure defined in claim 1 and wherein the supporting means comprises an adapter bracket embodying a horizontal member which is adapted to be secured to and supported from the aforementioned deck, said horizontal member being provided with an outstanding arm, said arm being at right angles to the horizontal member and being adapted to project beyond the aforementioned apron in a position below the apron, whereby to properly locate the bellcrank and limbs thereof in relation to the apertured portion of the apron and the aforementioned twine supply box.

References Cited in the file of this patent

UNITED STATES PATENTS

| 263,715 | Miller | Sept. 5, 1885 |
| 389,848 | Locke | Sept. 18, 1888 |
| 442,545 | Pridmore | Dec. 9, 1890 |
| 2,410,159 | Harrer et al. | Oct. 29, 1946 |
| 2,826,985 | Harrer | Mar. 18, 1958 |
| 2,829,585 | Varvel | Apr. 8, 1958 |